(12) United States Patent
Green

(10) Patent No.: US 7,641,086 B2
(45) Date of Patent: Jan. 5, 2010

(54) MOTORCYCLE RACK FOR PICKUP TRUCKS AND TRAILERS

(76) Inventor: Christopher Phillip Green, 3393 Diane Way, Madera, CA (US) 93637

(*) Notice: Subject to any disclaimer, the term of this patent is extended or adjusted under 35 U.S.C. 154(b) by 648 days.

(21) Appl. No.: 10/607,964

(22) Filed: Jun. 27, 2003

(65) Prior Publication Data
US 2004/0262347 A1    Dec. 30, 2004

(51) Int. Cl.
*B60R 9/06* (2006.01)
(52) U.S. Cl. .............. 224/405; 224/403; 224/548; 224/554; 224/570; 224/571; 224/924
(58) Field of Classification Search ........... 224/403, 224/405, 323, 325, 545, 547, 548, 552, 554, 224/570, 571, 924; 280/762, 769; 211/17, 211/20, 22–24
See application file for complete search history.

(56) References Cited

U.S. PATENT DOCUMENTS

| | | | |
|---|---|---|---|
| 3,931,903 A | | 1/1976 | Johnson |
| 4,057,182 A | | 11/1977 | Kolkhorst et al. |
| 4,084,736 A | | 4/1978 | Jacobs, Jr. |
| 4,852,779 A | * | 8/1989 | Berg .................. 224/42.32 |
| 4,921,152 A | * | 5/1990 | Kemming ............... 224/404 |
| 5,014,890 A | | 5/1991 | Perry |
| 5,092,504 A | | 3/1992 | Hannes et al. |
| 5,118,156 A | * | 6/1992 | Richard ..................... 296/40 |
| 5,127,564 A | | 7/1992 | Romero |
| 5,427,286 A | | 6/1995 | Hagerty |
| 5,443,190 A | * | 8/1995 | Cucheran et al. .......... 224/405 |
| 5,516,020 A | | 5/1996 | Lawler et al. |
| 5,549,231 A | * | 8/1996 | Fletcher et al. ........... 224/536 |
| 5,611,472 A | | 3/1997 | Miller |
| 5,702,007 A | * | 12/1997 | Fritz et al. ................. 211/17 |
| 5,836,490 A | * | 11/1998 | Price ....................... 224/403 |
| 6,109,494 A | | 8/2000 | Pilmore |
| 6,179,181 B1 | * | 1/2001 | Johnson et al. ........... 224/405 |
| 6,398,091 B1 | | 6/2002 | Munoz et al. |
| 6,523,731 B1 | * | 2/2003 | Pedrini .................... 224/537 |
| 7,051,909 B2 | * | 5/2006 | Gibson ..................... 224/403 |
| 2002/0066761 A1 | * | 6/2002 | Vining et al. .............. 224/405 |

OTHER PUBLICATIONS

CCR Sport, "The Bed Buddy," prior Jun. 27, 2003, 8 pages, Internet, US.

(Continued)

*Primary Examiner*—Gary E Elkins
(74) *Attorney, Agent, or Firm*—Richard A. Ryan

(57) ABSTRACT

A motorcycle rack for supporting a motorcycle in a generally upright position on the bed of a truck or trailer has a main support member transversing the bed to connect to and be supported by a first and second support assembly. The motorcycle rack has one or more wheel chock assemblies on the main support member for receiving a motorcycle wheel and supporting the motorcycle while the user places restraints, when necessary, around the motorcycle. The support assemblies and/or wheel chock assemblies can include loops for securing the motorcycle. One or more moveable tie-down holds can also be placed on main support member. The support assemblies can be removably mounted on the sidewall of the vehicle using a side member and clamp or mounted to the bed using a leg and receiver combination. Cradling or clamping wheel chock assemblies can be utilized to cradle or clamp the motorcycle's wheel.

45 Claims, 7 Drawing Sheets

OTHER PUBLICATIONS

Artisan Mfg., Inc. "Fast Pack Cargo Systems," prior Jun. 27, 2003, 2 pages, Internet, US.
Fisher Mototsport, "Motorcycle Wheel Chock," prior to Jun. 27, 2003, 2 pages, Internet, US.
Bike Pro, "Motorcyle Wheel Chock," prior to Jun. 27, 2003, 4 pages, Internet, US.
etrailer.com, "Wheel Chocks," prior to Jun. 27, 2003, 4 pages, Internet, US.

* cited by examiner

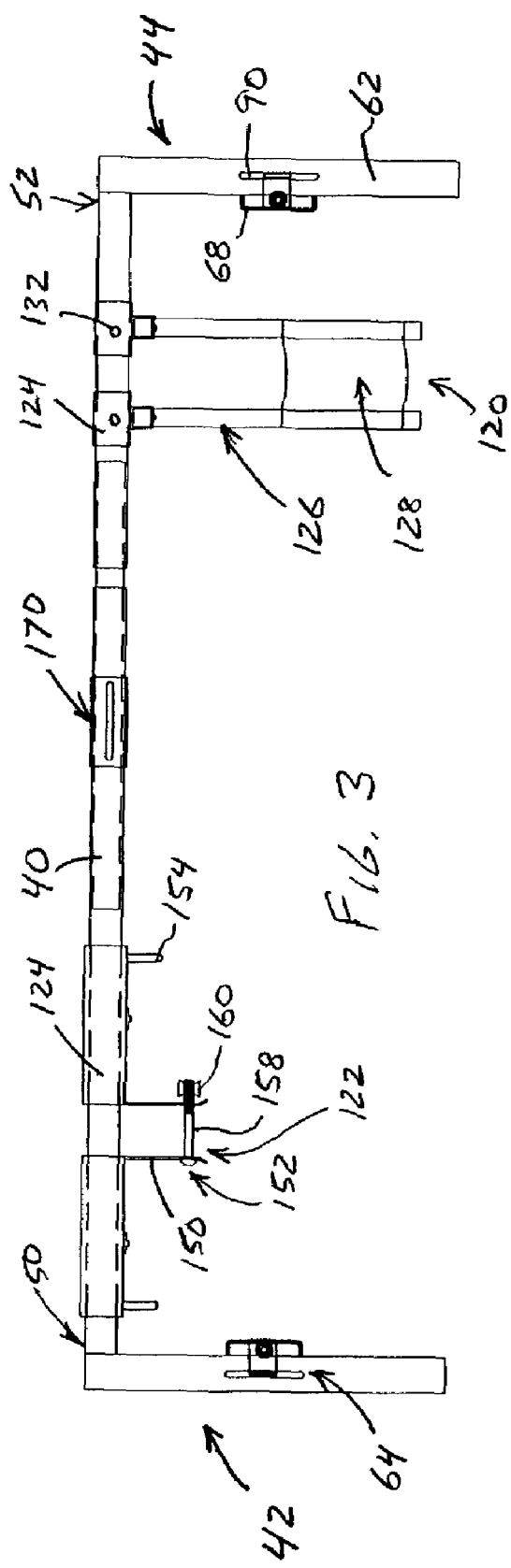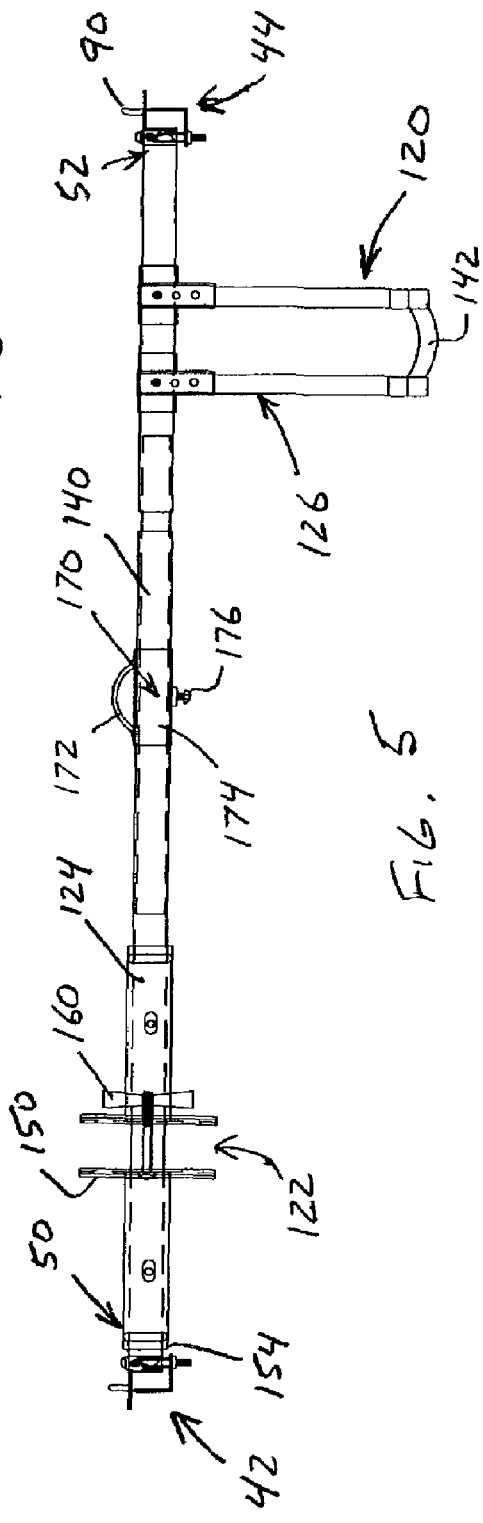

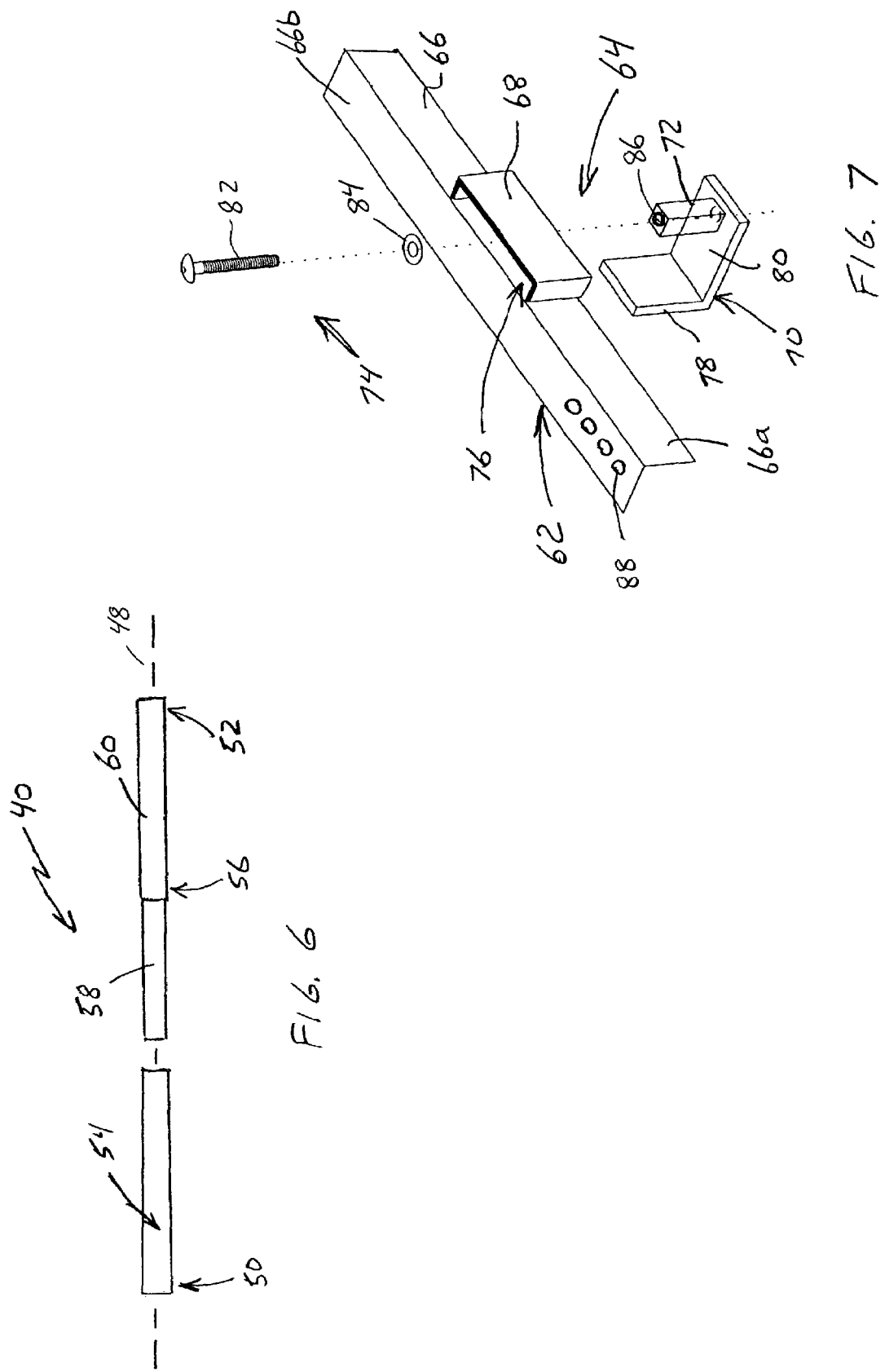

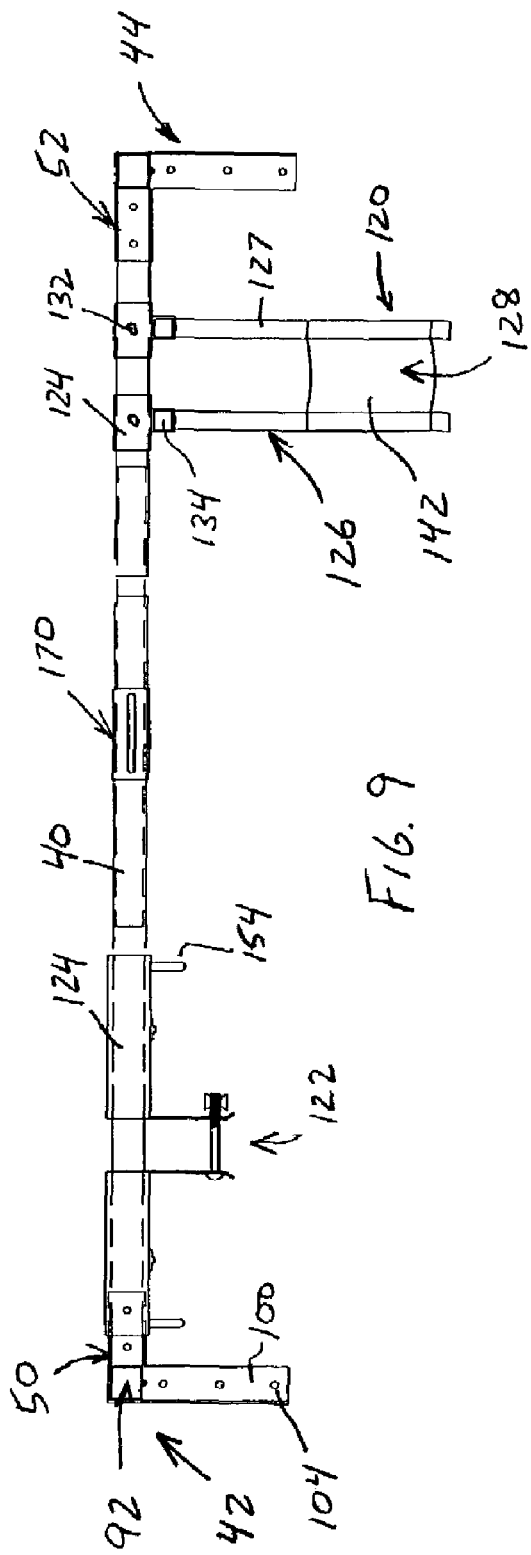
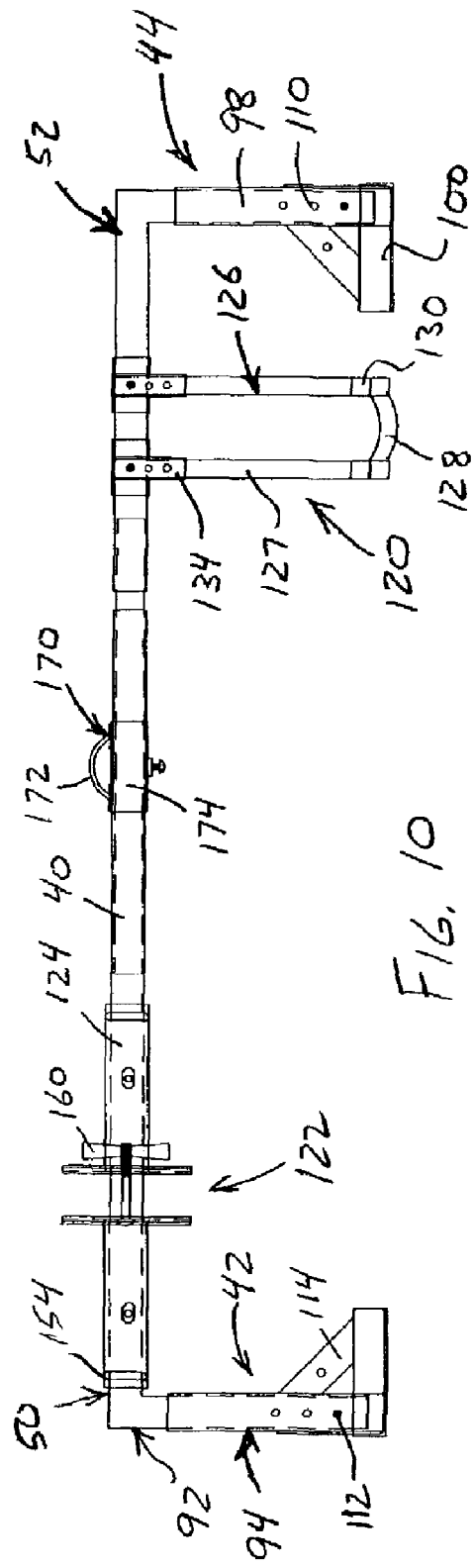

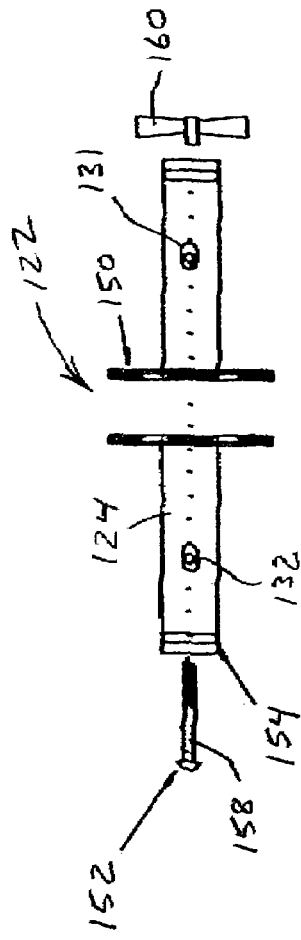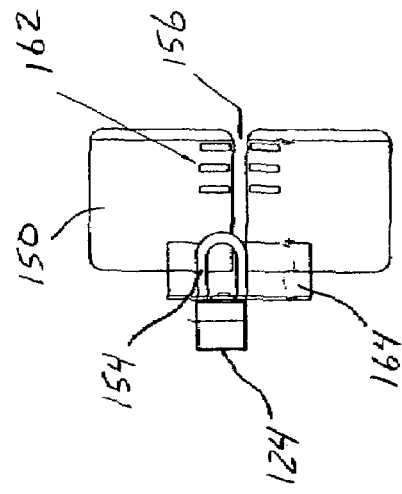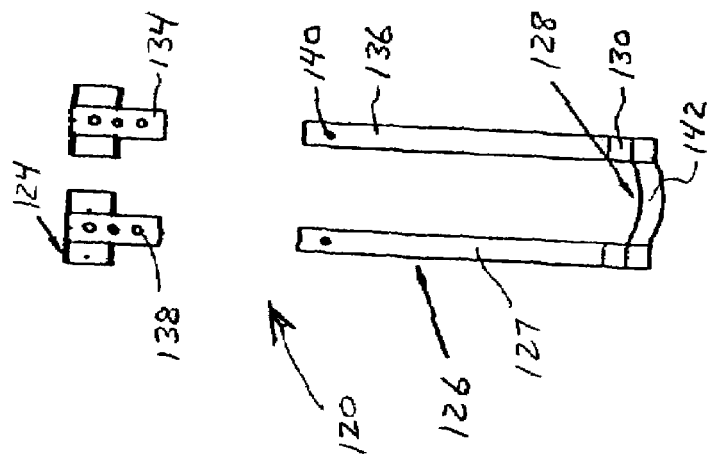

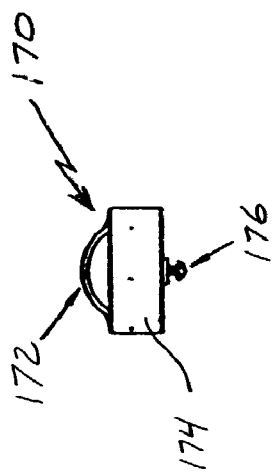
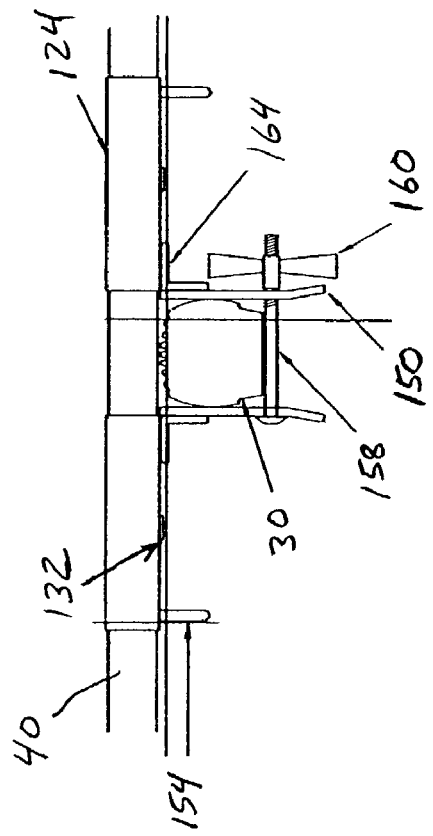

MOTORCYCLE RACK FOR PICKUP TRUCKS AND TRAILERS

BACKGROUND OF THE INVENTION

A. Field of the Invention

The field of the present invention relates generally to apparatuses for restricting the motion of a motorcycle while it is being carried in the bed of a pickup truck, trailer or similar vehicle. More particularly, the present invention relates to such apparatuses that safely support the motorcycle in a generally upright position and which protect the front of the truck or trailer bed and the motorcycle from damage. Even more particularly, the present invention relates to such apparatuses that can support more than one motorcycle, which are adaptable to different sized truck and trailer beds and which are easily removed from the truck or trailer without damage thereto.

B. Background

Many people ride motorcycles as their main form of transportation or for recreation or competitive purposes, including off-road enjoyment and racing. Many of the motorcycles that are driven primarily for off-road recreation or racing are not licensed for use on highways or, even if licensed or licensable for highway use, are not used for long distance highway travel. Most recreation areas that are particularly enjoyable and suitable for off-road motorcycle riding, including relatively large open areas such as forests and deserts, are typically located somewhat remote from cities and towns. It is also well known that motorcycle racing tracks, whether for professional or amateur racing, are generally not located in large population centers, due in part to local zoning regulations prohibiting such tracks. As such, the use of motorcycles for off-road recreation or racing purposes generally requires the transport of the motorcycle from the owner's house or other location where the motorcycle is stored to the typically distant recreation area or race track. It is also occasionally necessary or perhaps desirable to transport motorcycles that are licensed and suitable for driving on the highway instead of riding the motorcycle. For instance, the owner may need to transport the motorcycle to a repair facility or he or she may desire to transport the motorcycle to location to be used as a starting point for a motorcycle trip.

The typical motorcycle owner either utilizes a separate trailer, which is configured to haul one or more motorcycles, hitched to the back of another vehicle or place the motorcycle(s) in the back of a truck, such as the bed of a pickup truck. While specifically configured motorcycle trailers have certain advantages with regard to hauling motorcycles, relative to pickup truck beds and flat trailers (both of which are adaptable to a variety of non-motorcycle hauling uses), the use of a separate motorcycle trailer is not favored by many motorcycle owners due to the cost of the trailer, need for storage during non-use and its limited adaptability for hauling other materials and equipment. As a result, use of a pickup truck or flat trailer to haul a motorcycle is perhaps the most popular means of transporting motorcycles from one location to another. Once placed on the pickup truck or trailer bed, the motorcycle is typically strapped into position using ropes; stretch cords or other devices configured to prevent the motorcycle from falling over during transport. As is well known, failure to properly secure the motorcycle to the pickup truck or trailer bed can result in substantial damage, including total loss, to the motorcycle and damage to the pickup truck or trailer. In more severe cases, an improperly secured motorcycle can even result in damage to vehicles traveling behind the pickup or trailer carrying the motorcycle and/or injury or death to persons in those vehicles.

A number of prior art patents describe devices which can be used with a pickup truck, trailer or other vehicle to transport a motorcycle. Certain of these devices are configured to carry the motorcycle at the back end of the vehicle. For instance U.S. Pat. No. 4,084,736 to Jacobs, Jr. describes a vehicle mounted motorcycle rack that mounts to the back end of a vehicle and which is configured to raise the motorcycle to a fixed position for transport. U.S. Pat. No. 3,931,903 to Johnson describes a motorcycle rack for vehicles that operates in a similar fashion to transport a motorcycle at the back end of a vehicle slightly above the ground level. U.S. Pat. No. 4,034,872 to Jager describes a motorcycle rack for a tow truck that is adapted to be mounted on a tow truck sling and carry the motorcycle behind the tow truck. None of the aforementioned patents are configured to safely and securely retain one or more motorcycles in the bed of a pickup truck or on a trailer bed. Numerous patents describe racks configured to carry one or more bicycles in the bed of a pickup truck. One configuration, exemplified by U.S. Pat. No. 5,836,490 to Price, mounts to the side walls of the pickup bed compartment to receive the front and back wheels of the bicycle. U.S. Pat. No. 5,427,286 to Hagerty and U.S. Pat. No. 5,127,564 to Romero exemplify configurations where the mounting assembly mounts to the front of the pickup truck bed to attach to the bicycle handlebars. In another configuration, exemplified by U.S. Pat. No. 5,611,472 to Miller, U.S. Pat. No. 5,516,020 to Lawler et al. and U.S. Pat. No. 5,014,890 to Perry, the rack mounts at or near the center of the pickup bed so that it can grasp a tube portion of the bicycle frame. In yet another configuration, exemplified by U.S. Pat. No. 6,398,091 to Muñoz et al. and U.S. Pat. No. 5,092,504 to Hannes et al., the bicycle racks attaches to the frame of the bicycle with the front wheel removed. Because the bicycle racks described above are configured to transport bicycles not motorcycles, they are generally not suitable and not adaptable for safely and securely transporting a motorcycle in an upright position in a pickup truck bed or on a trailer bed.

With regard to motorcycle carrier assemblies that are configured to carry motorcycles in the bed portion of a pickup truck or trailer, U.S. Pat. Nos. 6,109,494 to Pilmore and U.S. Pat. No. 4,057,182 to Kolkhorst describe to different configurations. The patent to Pilmore describes a motorcycle transport system that has a base portion which mounts to the floor of the bed and a bracket portion that permanently mounts to the frame of the motorcycle. For transporting purposes, the motorcycle is placed in the truck bed such that the bracket interconnects with the base to secure the motorcycle in an upright position. The patent to Kolkhorst describes a motorcycle carrier that has a vertical strut which mounts to the sidewall of the pickup bed and a hook member transversely mounted to the upper end of the vertical strut. The free end of the hook member has an upwardly opening hook contour that is engagingly received by a luggage rack or an added loop attached to the motorcycle so as to maintain the motorcycle in a preselected distance above the truck bed floor. Both of the aforementioned truck bed motorcycle racks require modifications to the motorcycle and require at least a portion of the assembly to be bolted, in a semi-permanent fashion, to the pickup truck bed. Another product, referred to as the Bed Buddy™ from CRC Sport, utilizes a front member having two or three wheel slots, depending on the size of the truck bed, and tie-down members having tie-down loops for securing the motorcycle(s) with tie-downs, rope, chain or locks. This apparatus mounts to the truck bed and must be selected based on the size of the truck (i.e., mini or full-size trucks). Several companies, such as Bike Pro, etrailer.com, Artisan Mfg., Inc. and Fisher Motorsport sell wheel chock apparatuses for receiving the front wheel of a motorcycle. At least a portion of these devices bolt to the floor, front or sides of a pickup truck bed.

Although the art of truck bed motorcycle racks discloses various apparatuses for transporting one or more motorcycles in an upright position on a truck or trailer bed, none of the presently known pickup truck or trailer bed motorcycle racks provides a device suitable for easy use with different sized pickup trucks or trailers and with motorcycle wheels of different widths and diameters without the need for drilling holes into the truck or trailer bed. Most of the known motorcycle racks do not easily allow the motorcycle to stand in the rack, without assistance from someone, while the tie-down straps or other devices are put into position to secure the motorcycle to the pickup truck or trailer bed. What is needed, therefore, is a motorcycle rack that can removably fit onto different sized pickup truck and trailer beds, which can accept motorcycles wheels of different sizes and can accept multiple motorcycles, all without requiring modification to the pickup truck bed, trailer bed or motorcycle. What is also needed, is an ability for the user of the rack to stand the motorcycle in the rack while he or she secures the motorcycle to the pickup truck or trailer bed with straps or other devices.

SUMMARY OF THE INVENTION

The motorcycle rack for pickup trucks and trailers of the present invention solves the problems identified above. That is to say, the present invention discloses a motorcycle rack that is adaptable to truck and trailer beds of different widths, useful with multiple motorcycles and able to secure different sizes of motorcycle wheels. The motorcycle rack of the present invention protects the passenger compartment or cargo boxes located at the front of the pickup truck or trailer bed from damage by the motorcycle. The present motorcycle rack can temporarily maintain the motorcycle in an upright position without assistance from the rack user while he or she is securing the motorcycle to the truck or trailer bed with straps or other devices. In one configuration, the motorcycle rack of the present invention can be removably mounted to a pickup truck or trailer bed without any modifications to the truck bed, trailer bed or motorcycle. In another embodiment, only the drilling of screws into the truck or trailer bed is required. In use, the motorcycle rack of the present invention securely holds one or more motorcycles in an upright position on the pickup truck or trailer bed.

The motorcycle rack of the present invention utilizes a forward structural member, referred to as a spanner, that extends width-wise across the front of a pickup truck or trailer bed. When used to secure a motorcycle, the spanner will be disposed between the front wheel of the motorcycle and the front wall of the cargo box area of the pickup truck or trailer, thus preventing contact with and potential damage by the motorcycle wheel to the front wall of the cargo box of the pickup truck or trailer. In the preferred embodiment, the spanner consists of telescoping tubes and is expandable, thus allowing the motorcycle rack to fit various width pickup truck and trailer beds. One or more wheel chock assemblies, either a cradling wheel chock assembly or a clasping wheel chock assembly, can be installed on the spanner to allow the motorcycle rack to carry multiple motorcycles on a pickup truck or trailer bed. The wheel chock assemblies are adjustable in width and height, and can be located anywhere along the spanner, thus securing motorcycles having front wheels of various diameters and widths anywhere laterally between the sides of the pickup truck or trailer bed. Both types of wheel chock assemblies allow the motorcycle to stand upright in the motorcycle rack before the motorcycle is finally secured in place, thereby allowing the user to free his or her hands for tying the straps or operating the other devices that are used to secure the motorcycle to the truck or trailer bed. The motorcycle rack of the present invention incorporates three types of tie-down holds, fixed tie-down holds on the side, tie-down holds on the clamping chock(s), and additional movable tie-down holes which can located anywhere on the spanner, thereby allowing the motorcycle to be tied down more securely from multiple points located both to the front and the sides of the motorcycle. Set screws are integrated into the movable tie-down hold(s) and into both kinds of the wheel chock assembly, thus allowing the operator to fix their location on the spanner. The rack is mounted with its horizontally oriented side members, or "side wings," resting atop the side bedrails of the pickup truck or trailer. The side wings are secured to the side bedrails using an integrated clamping system which can be used on a vehicle having side rails with or without stake pockets, thereby allowing the motorcycle rack to be utilized without drilling holes into the pickup truck or trailer. When mounting the motorcycle rack to the sides of the truck or trailer is not possible or desirable, an alternative vertically oriented "side leg" design can be used. In this configuration, the side legs of the rack slide up or down in a receiver that is bolted to the floor of the pickup truck or trailer bed and is held at various heights by the use of snap buttons or pins, thus allowing the main part of the motorcycle rack to be quickly installed or removed.

More specifically, in one aspect of the present invention, the motorcycle rack for supporting a motorcycle in a generally upright position on a bed of a vehicle has an elongated main body member with a principal longitudinal axis, a first main body end and an opposing second main body end. A first support assembly attaches to the first main body end and to the vehicle and a second support assembly attaches to the second main body end and the vehicle. The first and second support assemblies are configured to transversely support the main body member above the bed of the vehicle. Attached to the main body member are one or more wheel chock assemblies, each of which has one or more connection members, a securing mechanism for securing the connection member(s) to the main body member and a holding mechanism attached to the connection member(s) for holding a wheel of the motorcycle in a generally fixed position on or above the bed of the vehicle. In the preferred embodiment, the connection member(s) are generally tubular shaped and have a longitudinal axis substantially in common with the longitudinal axis of the main body member such that they are slidably disposed on the main body member so as to permit movement of the connector along the longitudinal length of the main body member. Preferably, the main body member is longitudinally adjustable in length, being comprised of at least a first telescoping member, a second telescoping member and a mechanism for fixing the longitudinal length of the main body member to fit the bed of the vehicle. One or more loop members for tying ropes, straps or other tie-downs to secure the motorcycle can be located on at least one of the first and second support assemblies.

In one embodiment, either or both of the first and second support assemblies has a side member configured to be, supportably attached to a vertically displaced wall (i.e., the sidewall) of the bed and a clamp configured to fixedly clamp the side member to the vertically displaced wall. The side member can comprise an L-shaped member and the clamp can comprise a channel member attached to and inwardly protruding from the side member, a clamp hook having a clamp tube, and a clamp member configured to be removably received by the clamp tube. Alternatively, at least one of the first and second support assemblies has a leg member attached to the main body member and a receiver member attached to the bed and configured to receive at least a portion of the leg member. Preferably, the leg member is slidably received in the receiver member and in a locking relationship therewith (i.e., with the use of snap-button connectors or the like) so as to fix the height of the main body member relative to the bed.

The holding mechanism of the one or more wheel chock assemblies can comprise a frame extending generally downward from said connection member in a generally arcuate shape, one or more wheel support members (preferably made out of flexible material) attached to the frame and one or more securing means for securing the wheel support members to the frame. The wheel support members are configured to substantially cradle the wheel of the motorcycle in the wheel chock assembly. Preferably, the frame adjustably connects to the connection member so as to adjust the height of the wheel support member above the bed of the vehicle. In another embodiment, the holding mechanism has a pair of clamp plates and a plate connector that is suitable for interconnecting the pair of clamp plates when the pair of clamp plates are disposed on opposite sides of motorcycle wheel and configured to clamp the clamp plates against the wheel. Separate clamp plates can be attached to separate connections members. The motorcycle rack can have one or more of a single type of holding mechanism or it can utilize one or more of each type of holding mechanism. Loop members can be attached to the connection members or to a separate tubular member that is configured to be slidably disposed on the main body member. The rack can utilize a setscrew or other mechanism for removably positioning the tubular member on the main body member.

Accordingly, the primary objective of the present invention is to provide an improved, versatile motorcycle rack for pickup truck and trailer beds to secure a motorcycle to a pickup truck or trailer bed that provides the advantages discussed above and that overcomes the disadvantages associated with presently available motorcycle racks and chock assemblies.

It is also an important objective of the present invention to provide a motorcycle rack that is adaptable to a wide range of pickup truck and trailer bed sizes and a wide range of motorcycle tire sizes.

It is also an important objective of the present invention in the primary configuration to provide a motorcycle rack that is easily installed on and removed from standard pickup truck and trailer beds without requiring modification to the truck, trailer or motorcycle and which can secure one or more motorcycles in a generally upright position on the truck or trailer bed.

It is also an important objective of the present invention to provide a motorcycle rack that secures the motorcycle on a truck or trailer in a manner that protects the truck or trailer bed and motorcycle from damage during transit.

It is also an important objective of the present invention to provide a motorcycle rack that is able to temporarily hold the motorcycle in an upright position without assistance from the operator while the operator secures the motorcycle to the truck or trailer bed.

It is also an important objective of the present invention to provide a motorcycle rack that has multiple tie-down points for securing the motorcycle on a truck or trailer bed.

It is also an important objective of the present invention to provide a motorcycle rack that requires minimum modification to the truck or trailer bed and which is adaptable to truck and trailer beds that do not have side bedrails or for which it is not desirable or possible to use such bedrails.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention:

FIG. 3 is a top plan view of the embodiment of the motorcycle rack of the present invention showing use of side members as the support members and the use of both a cradling and a clamping wheel chock assemblies;

FIG. 5 is a rearward facing (i.e., towards the back of the pickup truck or trailer beds in FIGS. 1 and 2) view of the motorcycle rack of the present invention shown FIG. 3;

FIG. 6 is a rearward facing exploded view of the main body member for use with the motorcycle rack of the present invention;

FIG. 7 is a perspective view of the side member embodiment of the support members for use with the motorcycle rack of the present invention;

FIG. 8 is an isolated rearward facing view of the side member embodiment of the support members of the motorcycle rack of the present invention;

FIG. 10 is a rearward facing (i.e., towards the back of the pickup truck or trailer beds in FIGS. 1 and 2) view of the motorcycle rack of the present invention shown FIG. 9;

FIG. 13 is a partially exploded view of the components of the cradling wheel chock assembly for use with the motorcycle rack of the present invention;

FIG. 14 is a partially exploded view of the components of the clamping wheel chock assembly for use with the motorcycle rack of the present invention;

FIG. 15 is a side view of the clamping wheel chock assembly of FIG. 14;

FIG. 16 is a top view the motorcycle rack of the present invention showing a wheel supported by a clamping wheel chock assembly; and FIG. 17 is a rearward facing view of a moveable tie-down for use with the motorcycle rack of the present invention.

DETAILED DESCRIPTION OF THE PREFERRED EMBODIMENTS

With reference to the figures where like elements have been given like numerical designations to facilitate the reader's understanding of the present invention, and particularly with reference to the embodiment of the present invention illustrated in FIGS. 1 through 17, the preferred embodiments of the present invention are set forth below. The enclosed figures and drawings are merely illustrative of the preferred embodiments and represent several different ways of configuring the present invention. Although specific components, materials, configurations and uses are illustrated, it should be understood that a number of variations to the components and to the configuration of those components described herein and in the accompanying figures can be made without changing the scope and function of the invention set forth herein.

Figure 2:
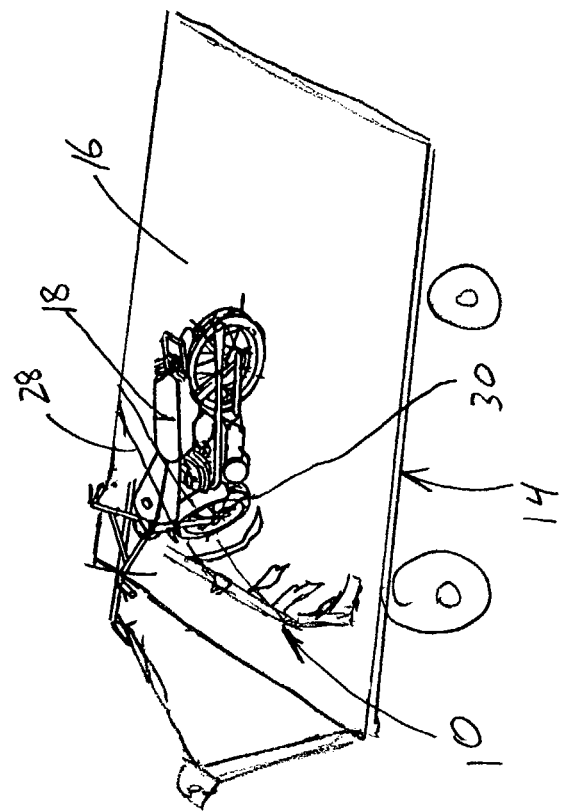
FIG. 2 is a top perspective view of a trailer-type vehicle using the motorcycle rack of the present invention to support a motorcycle in a generally upright position on the bed of the trailer.
Figure 1:
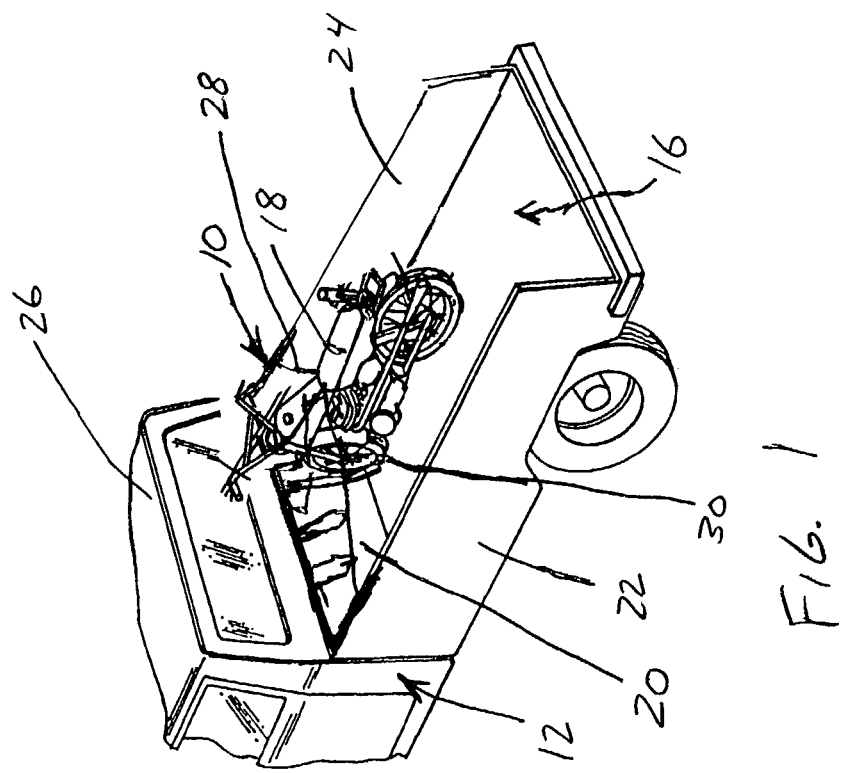
FIG. 1 is a top perspective view of a pickup truck-type vehicle using the motorcycle rack of the present invention to support a motorcycle in a generally upright position on the bed of the pickup truck.

The motorcycle rack of the present invention, identified generally as 10, is configured for use with pickup trucks 12, trailers 14 and similar vehicles having a generally horizontally displaced load-bearing bed 16 on which can be placed a motorcycle 18 in a generally upright position, as shown in FIGS. 1 and 2. As shown in FIG. 1, the typical pickup truck 12 has bed. 16 which is bounded on its periphery by at least a vertically displaced forward wall 20 and opposing sidewalls, such as left sidewall 22 and right sidewall 24. A typical use for motorcycle rack 10 of the present invention with pickup truck 12, as explained in more detail below, is to mount rack 10 transversely across bed 16 at or near forward wall 20 immediately behind the forward cab portion 26 of pickup truck 12 and to utilize one or more ropes, straps, tie-downs or other flexible restraints, shown as 28, to secure motorcycle 18 to bed 16. Although motorcycle rack 10 can be placed elsewhere on bed 16, it is generally easier for loading and unloading purposes and more efficient use of space to place motorcycle 18 on bed 16 in a generally forward facing direction such that its front wheel 30 is held by motorcycle rack 10. On flatbed trailers and similar vehicles 14, an example of which is shown in FIG. 2, one or more motorcycle racks 10 can be placed on bed 16. Although it is not uncommon for trailers 14 have vertically displaced front and side walls similar to those for pickup trucks 12, many trailers 14 have bed 16 without front and side walls.

Motorcycle rack 10 of the present invention is primarily comprised of an elongated main body member 40, first support assembly 42, second support assembly 44 and one or more wheel chock assemblies 46. As set forth in more detail below, these components function together allow the user of motorcycle rack 10 to safely and securely mount one or more motorcycles 18 in a generally upright position on bed 16 of a pickup truck 12 or trailer 14 for transport of motorcycles 18. In the preferred embodiments of the present invention, shown in the figures, first support assembly 42 and second support assembly 44 are attached to main body member 40, also referred to as a spanner, and configured so as to transversely support main body member 40 in a substantially horizontal position above bed 16 of pickup truck 12 or trailer 14. In one configuration, shown FIGS. 1 and 2, main body member 40 transversely spans substantially the entire width of bed 16. The placement of main body member 40 at forward wall 20 protects forward wall 20 and cab portion 26 from damage caused by contact with motorcycle 18, either during the loading/unloading process or during transport. Main body member 40 can be made out of various sized and shaped materials, such as the square tubular material (shown in FIG. 4), having principal longitudinal axis 48 and first main body end 50 and second main body end 52, as best shown in FIG. 6.

Various materials can be used for the components of motorcycle rack 10 of the present invention. For instance, main body member 40, first support assembly 42, second support assembly 44 and wheel chock assembly 46 can be made out of metal, fiberglass, composites, certain plastics and various other materials and combinations of materials that have sufficient strength, rigidity, durability and corrosion resistance for the components of motorcycle rack 10 of the present invention. If desired, coated or covered materials can be used to provide the necessary corrosion resistance for use as an apparatus exposed to the outside elements. It is desirable that main body member 40 be made out of material that is sufficiently strong to resist damage from contact with motorcycle 18 and to prevent damage to forward wall 20 and/or cab portion 26 of pickup truck 12. In addition, main body member must have sufficient size and strength to support the one or more wheel chock assemblies 46 and motorcycles 18 used with motorcycle rack 10.

Although motorcycle rack 10 can be configured with a particular length of main body member 40 to fit a specific width bed 16, the preferred embodiment of motorcycle rack 10 of the present invention has main body member 40 configured to be longitudinally adjustable in length so that a single motorcycle rack 10 may be utilized on a variety of different sized pickup trucks 12 and trailers 14 having different widths of bed 16. In a preferred embodiment, best shown in FIG. 6, main body member 40 is comprised of two or more separate substructures, such as first telescoping member 54 and second telescoping member 56, that cooperate together in a telescoping manner to allow the user to lengthen or shorten the longitudinal length of main body member 40 to fit different sizes of bed 16. In the preferred configuration, second telescoping member 56 is sized and configured to be insertably received by first telescoping member 54. This can be achieved by configuring second telescoping member 56 to have a reduced cross-section portion 58 at the end to be received by first telescoping member 54. Reduced cross-section portion 58 of second telescoping member 56 can be a separate component that is fixedly attached to the enlarged portion 60 by welding, use of adhesives, use of bolts, screws, rivets or other connectors, or by other forms of joining two members of different cross-sectional sizes that are known in the art. Alternatively, second telescoping member 56 can be a single member that has a reduced cross-section portion 58 cut or otherwise manufactured from that single member. The length of reduced cross-section portion 58 must be sufficient enough in order to maintain the alignment of the first telescoping member 54 and second telescoping member 56 along a generally common axis and to resist forces that are right angle to that axis. When properly configured with the enlarged portion 60 being the same size as first telescoping member 54 and the use of reduced cross-section portion 58 is that when first telescoping member 54 and second telescoping member 56 are joined together, with the reduced cross-section portion 58 inside first telescoping member 54, the appearance will be of a single sized main body member 40.

In the figures, first support assembly 42 is shown attached to first main body end 50.and second support assembly 44 is shown attached to second main body end 52 of main body member 40. When used with vehicles having sidewalls, such as left sidewall 22 and right sidewall 24, shown in FIG. 1, motorcycle rack 10 of the present invention can utilize a pair of support assemblies, such as first support assembly 42 and second support assembly 44, that attach to the vertically displaced left 22 and right 24 sidewalls, respectively, as generally shown in FIG. 1. In this configuration, support assembly 42 and/or 44 can comprise side member 62 that is supportably attached to sidewalls 22 or 24 and clamp 64 configured to fixedly, but removably, clamp side member 62 to sidewall 22 or 24 such that side member 62 is held down against the upper surface portion of sidewall 22 or 24. In the preferred embodiment of the present invention, shown in FIG. 7, side member 62 comprises a generally L-shaped member 66 that can abut the inside (i.e. towards bed 16) and upper portions of sidewall 22 or 24. In this manner, one side of L-shaped member 66 is oriented generally horizontally atop sidewall 22 or 24 and the other side is oriented generally vertically on the inside of sidewall 22 or 24. Side member 62 can be placed anywhere on sidewall 22 or 24 where it is desired to mount motorcycle rack 10 of the present invention. Typically, a pair of side members 62 will be placed on opposite sidewalls 22 and 24 in a corresponding relationship generally across bed 16 from each other with main body member 40 disposed between. As best shown in FIGS. 3 and 5, one end of side member 62 will be attached to suitable for attachment to either first main body end 50 or second main body end 52 of main body member 40. In the preferred embodiment, first main body end 50 of main body member 40 is fixedly attached in a generally right angle relationship to the vertically disposed component 66a of L-shaped member 66 of first support assembly 42 and second main body end 52 of main body member 40 is fixedly attached in a generally right angle relationship to the vertically disposed component 66a of L-shaped member 66 of second support assembly 44. Attachment of side member 62 to either first main body end 50 or second main body end 52 can be accomplished by welding or other fixed means, by bolting, riveting or other attachment mechanisms or by forming side members 62 and main body member 40 out of a single piece of material.

To effectively and safely support main body member 40 and motorcycle 18 in or on bed 16, first 42 and second 44 support assemblies having side members 62 should be fixed, albeit preferably temporarily, to left 22 and right 24 sidewalls. In a preferred embodiment of the present invention, shown in FIGS. 3, 4 and 5, each of first 42 and second 44 support assemblies utilize clamp 64 to selectively clamp side member 62 to sidewalls 22 and 24. Preferably, clamp 64 is of the type that is adaptable for a variety of configured sidewalls 22 or 24, easy to install and remove and effective at tightly holding support assemblies 42 and 44 on sidewalls 22 and 24. In the preferred embodiment, best shown in FIG. 7, clamp 64 comprises a channel member 68 affixed to the inside of side member 62 (i.e., on vertically disposed component 66a towards interior of bed 16), a clamp hook 70 configured to clamp against sidewall 22 or 24, a clamp tube 72 on clamp hook 70, and a clamp member 74 configured to clamp and un-clamp side member 62 from sidewalls 22 and 24 as desired to install or remove motorcycle rack 10. Channel member 68 is fixed, by welding or other means, to side member 62 such that it forms, with side member 62, channel 76 sized and configured for receiving clamp tube 72 therein. As shown in FIG. 7, the top of channel member 68 should be substantially level with the horizontally disposed component 66b of side member 62.

As best shown in FIGS. 7 and 8, clamp hook 70 is comprised of an upwardly extending portion 78 and an inwardly extending portion 80 configured together in a generally L-shaped configuration. Clamp tube 72 is affixed at or near the inside end (i.e., bed 16 side) of inwardly extending portion 80 and configured to extend upward, so as to form a generally U-shaped member with clamp hook 70, and fit inside channel 76. The upwardly extending portion 78 is configured to extend upward into the bedrail channel space (not shown) at the top of sidewalls 22 and 24 on pickup truck 12 when side member 62 is abutting the inside and upper portions of sidewalls 22 and 24 and clamp tube 72 is inside channel 76. The top of upwardly extending portion 78 can be flattened or rounded so as to provide a blunt contact point with the underside surface of the bedrail channel so as to improve the contact for the desired clamping action. Because clamp tube 72 fits tightly inside channel 76, clamp hook 70 is effectively prevented from rotating around the axis of clamp member 74. Clamp member 74 is configured to be removably received by clamp hook 70 such that it causes clamp 64 to securely clamp side member 62 to sidewall 22 or 24. In the preferred embodiment, clamp member 74 is an externally threaded screw 82 that is used with washer 84 to abut the top of channel member 68 and side member 62 so as to pull upwardly extending portion 78 against the underside of the bedrail channel space at the top of left 22 or right 24 sidewall. Also in the preferred embodiment, shown in FIG. 7, clamp tube 72 has bore 86 therethrough having an internal diameter slightly larger than the diameter of screw 82 that allows screw 82 to pass through to a threaded hole (not shown) in inwardly extending portion 80 below clamp tube 72 where screw 82 is threadably received therein to allow clamp member 74 to draw clamp hook 70 upward so as to secure side member 62 to sidewall 22 or 24. In an alternative configuration, bore 86 of clamp tube 72 is internally threaded for threadably receiving screw 82 in clamp tube 72. Once clamped, clamp 64 tightly holds side member 62 of first 42 or second 44 support assembly in place on left 22 or right 24 sidewall so that main body member 44 extends generally transversely across bed 16 to another support member (i.e., first 42 or second 44 support assembly), as shown in FIG. 1. When not fully tightened, side member 62 and clamp 64 may be slid horizontally along the top of sidewall 22 or 24 and inside the bedrail channel to the best location on sidewall 22 or 24 to avoid any obstructions under the bedrail.

If desired, certain components of side member 62 and clamp 64 may be coated with or made out of materials that are less likely to scratch or otherwise damage left 22 or right 24 sidewalls of pickup truck 12. For instance, the underside portion of vertically disposed component 66a and horizontally disposed component 66b of L-shaped member 66 and the inside portion of upwardly extending portion 78 and inwardly extending portion 80 of clamp hook 70 can be coated or otherwise covered. One or more holes 88 can be provided along horizontally disposed component 66b, as shown in FIG. 7, through which a bolt (not shown) projecting up from or down into an opening (not shown) in the top of sidewall 22 or 24, commonly referred to as a stake pocket, can connect with commonly available hardware in the stake pocket to further bolt that portion of side member 62 to sidewall 22 or 24. In addition, side member 62 can have one or more loop members 90, as shown in FIGS. 3 through 5 and 8, thereon for use as a tie-down hold to assist the user in securing motorcycle 18 with ropes, straps or other tie-down devices.

Figure 12:
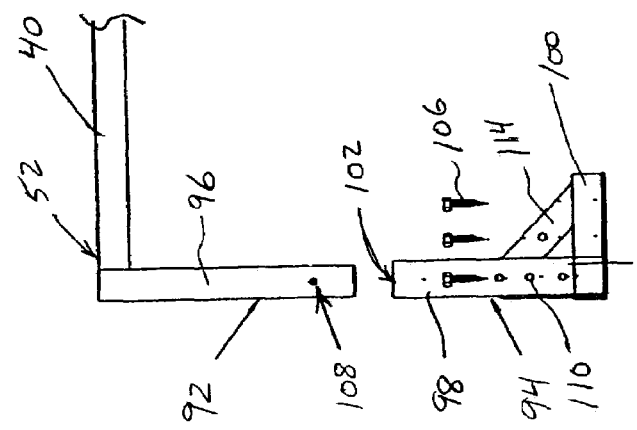
FIG. 12 is an exploded rearward facing view of the leg and receiver members of the motorcycle rack of the present invention.
Figure 11:
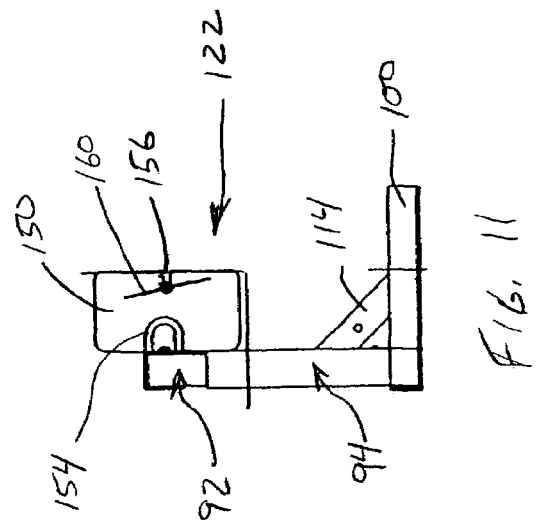
FIG. 11 is an isolated side view of the motorcycle rack of the present invention shown in FIG. 9 showing the clamping wheel chock assembly.

When attachment of first support assembly 42 and/or second support assembly 44 to the left sidewall 22 and/or right sidewall 24 is not possible (i.e., when trailer 14 shown in FIG. 2 is utilized) or desirable (i.e., when a camper shell or other cover is placed on pickup truck 12), support assembly 42 and/or 44 can be removably mounted directly on bed 16. In this configuration, as shown in FIGS. 9 through 12, support assembly 42 and/or 44 can comprise leg member 92 attached to first main body end 52 and/or second main body end 54 of main body member 40 and receiver member 94 mounted to bed 16. In the preferred embodiment, best shown in FIGS. 10 through 12, leg member 92 is a leg tubular member 96 welded at its upper end to first main body end 52 and/or second main body end 54 and receiver member 94 comprises a receiver tubular member 98 that is welded or otherwise fixedly connected in a generally upright position to base member 100 such that opening 102 at the top of receiver tubular member 98 is upwardly facing. If desired, receiver tubular member 98 can be removably attached to base member 100. As shown in FIGS. 10 and 11, the outside diameter of leg tubular member 96 is configured to be smaller than the inside diameter of opening 102 and receiver tubular member 98 so tat leg tubular member 96 can be removably received inside receiver tubular member 98. Base member 100 has one or more base holes 104 to allow receiver 94 to be screwed, with screws 106, or bolted to bed 16 so it may be removed from bed 16 as necessary or desired. Alternatively, base member 100 may be welded, riveted or attached by a variety of other mechanisms to bed 16. To allow far an adjustment of height for motorcycle rack 10, leg tubular member 96 can comprise one or more leg holes 108 and receiver tubular member 98 can comprise one or more receiver holes 110 such that when leg tubular member 96 is inside receiver tubular member 98 a connector 112 can be used to connect leg member 92 to receiver member 94. If leg holes 108 and receiver holes 110 pass though leg tubular member 96 and receiver tubular member 98, respectively, then connector 112 can be a retainer pin or like device, otherwise connector 112 can be a snap-button or like device. As shown in FIGS. 10-12, One or more reinforcing members, such as gussets 114, can be utilized to support and maintain the generally vertical orientation, relative to base member 100, of receiver tubular member 98.

As set forth above, motorcycle rack 10 of the present invention will have one or more wheel chock assemblies 46 attached to main body member 40. In the preferred embodiment, each wheel chock assembly 46 is configured to be slidably received on main body member 40 so that wheel chock assembly 46 may support motorcycle 18 on bed 16 where most desired. One configuration for wheel chock assembly 46 is the cradling wheel chock assembly identified as 120 in the figures. Another configuration for wheel chock assembly 46 is the clamping wheel chock assembly identified as 122 in the figures. Both wheel chock assemblies 120 and 122 utilizes one or more horizontally disposed tubular connection members 124 shaped and configured to generally correspond to the shape of main body member 40 and have an inside circumference slightly larger than the outside circumference of main body member 40. As best shown in FIGS. 3, 5, 9 and 10, connection members 124 are mounted annularly onto main body member 40 so that they can be slid anywhere along main body member 40 where desired. Each connection member 124 has a threaded hole (shown as 131 in FIG. 14) in one face that accepts a setscrew 132 for fixing the position of the connection member 124 on main body member 40. As set forth below, different mechanisms for holding the front wheel 30 of motorcycle 18 are utilized depending on whether wheel chock assembly 46 is configured with the cradling wheel chock assembly 120 or clamping wheel chock assembly 122.

Figure 4:
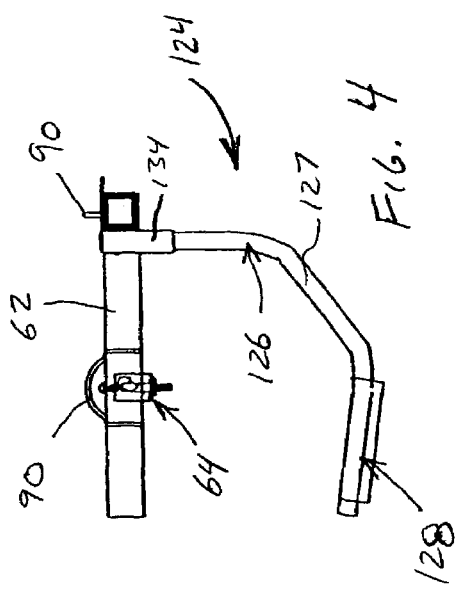
FIG. 4 is an isolated side view of the motorcycle rack of the present invention shown in FIG. 3 showing the cradling wheel chock assembly.

Cradling wheel chock assembly 120 comprises frame 126 having two or more frame members 127, one or more wheel support assemblies 128 and one or more securing mechanisms 130. Frame 126 of cradling wheel chock assembly 120 attaches to connection member 124. In the preferred embodiment, best shown in FIG. 13, frame 126 comprises a small tubular receiver 134 and side tubes 136. Tubular receiver 134 is fixedly attached (i.e., welded, bolted, screwed, etc.) to each connection member 124 for slidably receiving a side tube 136 therein. To facilitate the connection between tubular receiver 134 and side tube 136, tubular receiver 134, has one or more holes 138 in a substantially vertical line. In the preferred embodiment, a vertical plate (not shown) is welded to the inside edge of tubular receiver 134 in a substantially right angle relationship with main body member 40 and positioned such that it extends outwardly away from main body member 40 to serve as a guide and lateral support for front wheel 30 of motorcycle 18. In the preferred embodiment, each side tube 136 is a metal tube having an outside circumference slightly smaller than the inside circumference of tubular receivers 134. Near the top end of each side tube 136 is a hole containing a snap-button connector 140. When the top end of each side tube 136 is inserted into the bottom of each tubular receiver 134, snap-button connector 140 snaps into one of holes 138 in the vertical tube of tubular receiver 134, thereby fixing the height of side tubes 136 in the tubular receiver 134. Frame members 127 extend generally downward from connection members 124 and then bend away in a generally arcuate shape from main body member 40 (i.e., toward the tailgate in pickup truck 12) until they are generally horizontal relative to bed 16, as best shown in FIG. 4.

In the preferred embodiment for clamping wheel chock assembly 120, wheel support member 128 comprises one or more flexible bands 142 consisting of one or more straps of woven fabric or other flexible material that form loops on each side of the bands 142, as best shown in FIG. 13. Each loop has an inside circumference slightly larger than the outside circumference of side tubes 136 and slips over the bottom end of each side tube 136. Flexible bands 142 are long enough to allow front wheel 30 (i.e., tire) of motorcycle 18 to sink down into the middle of support member 128 and draw side tubes 136 together against the side of wheel 30. Securing mechanism 130 on each side tube 136 comprises a band retention clip consisting of rigid bands attached to the bottom side near the back end of side tubes 136. The band retention clip bands run generally parallel to the bottom of side tubes 136 and bend back upon themselves just beyond the ends of flexible bands 142 in such a way as to retain flexible bands 142 in place to prevent them from sliding forward or backward along side tubes 136. In one configuration, securing mechanism 130 (i.e., band retention clips) are held in place by means of a rivet, screw, or other device located near the middle, between flexible bands 142. A washer (not shown) inserted between the top and bottom part of the clip 130 around the rivet creates a gap between the sides of the clip 130. This allows limited rotation of flexible bands 142 around side tubes 136.

Figure 9:
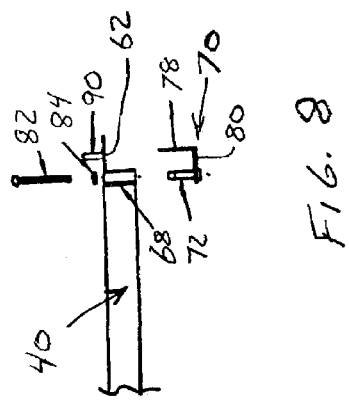
FIG. 9 is a top plan view of the embodiment of the motorcycle rack of the present invention showing use of leg/receiver members as the support members and the use of both a cradling and a clamping wheel chock assemblies.

The preferred embodiment of clamping wheel chock assembly 122, best shown in FIG. 14, comprises a pair of vertical clamp plates 150, each of which is fixedly attached to a horizontal disposed tubular connection member 124, and a plate connector 152 configured to clamp the pair of clamp plates 150 against the front wheel 30 of motorcycle 18. Each plate 150, which is preferably taller than it is wide, extends away from main body member 40 (i.e., rearward toward the tailgate of a pickup truck 12), and is welded to the rear-facing surface of connection member 124 near the interior end of connection member 124, as best shown in FIGS. 3 and 9. Also in the preferred embodiment, a fixed tie-down hold 154, also best shown in FIGS. 3 and 9, is welded to the surface of each connection member 124 at the end opposite clamp plate 150. A threaded hole containing a setscrew 132 is located in the center of connection member 124 approximately half way between clamp plate 150 and the tie-down hold 154. As best shown in FIG. 15, each clamp plate 150 contains a horizontal slot 156 that extends and inch or more from the rear edge of clamp plate 150 toward the front of bed 16. When clamping wheel chock assembly 122 is mounted on main body member 40 and a motorcycle wheel 30 has been placed into the chock assembly 122, as shown in FIG. 16, plate connector 152 is placed within the rim of the wheel 30 and slid forward within the slots 156 in each clamp plate 150. In the preferred embodiment, plate connector 152 comprises carriage bolt 158 with a square shaft or head on one end and a wing nut 160 threaded on the other end. Preferably, the head of carriage bolt 158 has a square base that is only slightly smaller than the width of slot 156. Bolt 158 extends from one clamp plate 150 to the other, with the head of bolt 158 pressing against the outer face of one clamp plate 150 and the body of wing nut 160 pressing against the face of the other. When wing nut 150 is tightened, it draws the head of bolt 158 towards it and clamp plates 150 are drawn together to firmly squeeze the sides of wheel 30. Also in the preferred embodiment, as shown in FIG. 15, each clamp plate 150 has a series of raised ridges 162 on the outside face of each clamp plate 150 extending out from slot 156. When tightened, bolt 158 and wing nut 160 can no longer slide freely within slot 156 due to the raised ridges 162 on each clamp plate 150 preventing the head of bolt 158 or wing nut 160 from moving horizontally along slot 156. Moreover, bolt 158 will not be able to rotate due to the base of the head of bolt 158 being square and the flats of the square making contact with the sides of slot 156 when bolt 158 begins to rotate. If desired, angle support 164 can be placed at the corner of clamp plate 150 and connection member 124, as shown in FIGS. 15 and 16, to provide additional support for clamp plates 150.

In addition to the fixed tie down devices, such as tie down loops 90 on side members 62 and fixed tie-down holds 154 on connection members 124, the preferred embodiment of the motorcycle rack 10 of the present invention includes one or more moveable tie-downs 170, as shown in FIGS. 3, 5, 9 and 10. As best shown in FIG. 17, moveable tie-down 170 of the preferred embodiment includes one or more loop members 172 fixedly attached to a tubular member 174 that is sized and configured to be slidably disposed on main body member 40. In use, moveable tie-downs 170 are mounted annularly on the main body member 40 and are used to provide additional anchor points to attach the tie-down straps 28 for the motorcycle(s) 18. The inside circumference of tubular member 174 is slightly larger than the outside circumference of main body member 40 to allow moveable tie-down 170 to be slid anywhere along main body member 40. In the preferred mechanism, a setscrew 176 on the side of tubular member 174 is utilized as a mechanism for fixing moveable tie-down 170 in place after removably positioning it where desired. As is known in the art, instead of using setscrew 176 to removably position moveable tie-down 170 on main body member 40, motorcycle rack 10 could utilize bolts, screws, clamps, pins and other devices to fix the position of tie-down 170.

In use, the user of motorcycle rack 10 of the present invention will decide whether he or she wants to use one or more cradling wheel chock assemblies 120, one or more clamping wheel chock assemblies 122 or some combination of these two types of wheel chock assemblies, such as one of each as shown in FIGS. 3, 5, 9 and 10. Also, depending on the circumstances, such as whether vehicle 12 or 14 has sidewalls and whether the sidewalls are available for use, or preferences, the user will decide whether first support assembly 42 and second support assembly 44 will either comprise a pair of side member 62 and clamp 64 components, a pair of leg member 92 and receiver member 94 components or a combination of one side member 62 and clamp 64 and one leg member 92 and receiver member 94. The tubular connection members 124 for wheel chock assemblies 120 and 122 and the tubular member 174 of any moveable tie-downs 170 to be utilized, are slid onto and over main body member 40 prior to reduced cross-section portion 58 of second telescoping member 56 being inserted into first telescoping portion 54 to form the adjustable length main body member 40. If the side member 62 and clamp 64 components are utilized as first 42 and/or second 44 support assemblies, such as shown in FIG. 1, side member 62 of first support assembly 42 is placed on top of left sidewall 22 and side member 62 of second support assembly 44 is placed on top of right sidewall 24 such that main support member 40 is transversely disposed across bed 16 between first 42 and second 44 support assemblies. A clamp 64 is placed on each side member 62 to secure them to sidewalls 22 and 24. If the leg member 92 and receiver member 94 components are utilized as first 42 and/or second 44 support assemblies, such as shown in FIG. 2, leg tubular member 96 is slid into receiver tubular member 98 and the desired height for main body member 40, which will be transversely disposed across bed 16 between first 42 and second 44 support assemblies, is selected with connector 112. If base member 100 is not fixedly mounted on bed 16 or attached to bed 16, it would need to be done so to secure motorcycle rack 10 to bed 16 (preferably prior to connecting the leg members 92 and receiver members 94 together).

When the cradling wheel chock assembly 120 is utilized, the front motorcycle wheel 30 is rolled into chock assembly 120 until the front of the tire 30 makes contact with main support member 40 (as shown in FIG. 16 for clamping wheel chock assembly 122) and the bottom of the tire 30 rests upon flexible bands 142 of wheel support member 128 at the base of cradling wheel chock assembly 120. The weight of the wheel 30 pushes down on wheel support member 128 such that it draws frame 126 of cradling wheel chock assembly 120 against wheel 30, applying firm lateral pressure to temporarily holding motorcycle 18 in an upright position and permitting the operator to tie down motorcycle 18 with restraints 28 without having to hold motorcycle 18 up at the same time. Cradling wheel chock assembly 120 cradles front wheel 30 and keeps it elevated above the floor of bed 16 so when the tie-down straps 28 from motorcycle 18 to rack 10 are tightened, the force of this tension is held primarily within motorcycle rack 10, rather than being transferred to the floor of bed 16, thereby, thus reducing the uplifting force which would otherwise tend to pry rack 10 upward off the surface to which it is attached. When clamping wheel chock assembly 122 is used, motorcycle wheel 30 is pushed forward into chock 122 until the wheel 30 makes contact with main support member 40. Bolt 158 with wing nut 160 is placed between the spokes of wheel 30 and within the internal diameter of the rim. When wing nut 160 is tightened, it draws the sides of clamping wheel chock assembly 122 very firmly against the sides of wheel 30 while bolt 158 blocks rearward movement, thus allowing motorcycle 18 to stand upright without assistance from the operator, and in the case of light-weight motorcycles 18, without using tie-downs or other restraints 28. Once in place, motorcycle 18 can be safely transported on bed 16 of pickup truck 12 or trailer 14.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape and use.

What is claimed is:

1. A motorcycle rack for supporting a motorcycle in a generally upright position on a bed of a vehicle, said motorcycle rack comprising:
    an elongated main body member having a principal longitudinal axis, a first main body end and an opposing second main body end;
    a first support assembly attached to said first main body end and to said vehicle;
    a second support assembly attached to said second main body end and said vehicle, said first support assembly and said second support assembly configured to support said main body member transversely across and above said bed of said vehicle so as to support said motorcycle generally perpendicular to said main body member, wherein at least one of said first support assembly and said second support assembly comprises a side member configured to be supportably attached to a vertically displaced wall of said bed and a clamp configured to fixedly clamp said side member to said vertically displaced wall; and
    one or more wheel chock assemblies, each of said one or more wheel chock assemblies having a connection member, means for fixing said connection member to said main body member and means for holding a wheel of said motorcycle in a generally fixed position on or above said bed of said vehicle, said connection member slidably disposed on said main body member between said first support assembly and said second support assembly so as to permit movement of said connector along the longitudinal length of said main body member, said holding means attached to said connection member.

2. The motorcycle rack according to claim 1, wherein said main body member is longitudinally adjustable in length.

3. The motorcycle rack according to claim 1, wherein said main body member is comprised of at least a first telescoping member, a second telescoping member and a means for fixing the longitudinal length of said main body member.

4. The motorcycle rack according to claim 3, wherein said first telescoping member and said second telescoping member are in telescoping relationship and said fixing means fixes the position of said first telescoping member relative to said second telescoping member.

5. The motorcycle rack according to claim 1, wherein said side member comprises at least one generally L-shaped member.

6. The motorcycle rack according to claim 1, wherein said clamp is comprised of a channel member attached to and protruding inward from said side member, a clamp hook having a clamp tube, and a clamp member configured to be removably received by said clamp tube.

7. The motorcycle rack according to claim 1 further comprising one or more loop members on at least one of said first support assembly and said second support assembly.

8. The motorcycle rack according to claim 1, wherein said connection member is generally tubular shaped and has a longitudinal axis substantially in common with said longitudinal axis of said main body member.

9. The motorcycle rack according to claim 1, wherein said holding means of at least one of said one or more wheel chock assemblies comprises a frame extending generally downward from said connector member, one or more wheel support members attached to said frame and one or more securing means for securing said wheel support members to said frame, said one or more wheel support members configured to substantially cradle said wheel of said motorcycle in said at least one wheel chock assembly.

10. The motorcycle rack according to claim 9, wherein said frame adjustably connects to said connection member so as to adjust the height of said one or more wheel support members above said bed of said vehicle.

11. The motorcycle rack according to claim 9, wherein said frame extends downward in a generally arcuate shape and said one or more wheel support members are made from a flexible material, said wheel support members configured to draw said frame against said wheel when said wheel is placed into said holding means.

12. The motorcycle rack according to claim 1, wherein said holding means of at least one of said one or more wheel chock assemblies comprises a pair of clamp plates and a plate connector interconnecting said pair of clamp plates, said pair of clamp plates configured to be disposed cm opposite sides of said wheel of said motorcycle and said plate connector configured to clamp said pair of clamp plates against said wheel.

13. The motorcycle rack according to claim 12, wherein said at least one wheel chock assembly comprises a pair of connection members and one of said pair of clamp plates is attached to one of said pair of connection members.

14. The motorcycle rack according to claim 1, wherein said one or more wheel chock assemblies comprises at least a first wheel chock assembly and a second wheel chock assembly, said holding means of said first wheel chock assembly comprising a frame having a pair of frame members and one or more wheel support members attached to said frame, said wheel support members configured to substantially cradle a wheel of a first motorcycle in said first wheel chock assembly, said holding means of said second wheel chock assembly comprising a pair of clamp plates and a plate connector interconnecting said pair of clamp plates, said pair of clamp plates configured to be disposed on opposite sides of a wheel of a second motorcycle and said plate connector configured to clamp said pair of clamp plates against said wheel of said second motorcycle.

15. The motorcycle rack according to claim 1 further comprising one or more loop members attached to said connection member.

16. The motorcycle rack according to claim 1 thither comprising one or more loop members attached to a tubular member sildably disposed on said main body member and means for removably positioning said tubular member on said main body member.

17. A motorcycle rack for supporting a motorcycle in a generally upright position on a bed of a vehicle, said motorcycle rack comprising:
    an elongated main body member having a principal longitudinal axis, a first main body end and an opposing second main body end, said main body member being longitudinally adjustable in length;
    a first support assembly attached to said first main body end and to said vehicle, said first support assembly having a side member configured to be supportably attached to a vertically displaced wall of said bed and a clamp configured to clamp said side member to said vertically displaced wall of said bed;
    a second support assembly attached to said second main body end and said vehicle, said first support assembly and said second support assembly configured to transversely support said main body member in a substantially horizontal position above said bed of said vehicle; and one or more wheel chock assemblies, each of said one or more wheel chock assemblies having a connection member, means for fixing said connection member to said main body member and means for holding a wheel of said motorcycle in a generally fixed position on or above said bed of said vehicle, said connection member slidably disposed on said main body member between said first support assembly and said second support assembly so as to permit movement of said connector along the longitudinal length of said main body member, said holding means attached to said connection member.

18. The motorcycle rack according to claim 17, wherein said main body member is comprised of at least a first telescoping member, a second telescoping member and a means for fixing the longitudinal length of said main body member, said first telescoping member and said second telescoping member being in telescoping relationship, said fixing means configured to fix the position of said first telescoping member relative to said second telescoping member.

19. The motorcycle rack according to claim 17, wherein said clamp is comprised of a channel member attached to and protruding inward from said side member, a clamp hook having a clamp tube, and a clamp member configured to be removably received by said clamp tube.

20. The motorcycle rack according to claim 17 further comprising one or more loop members on at least one of said first support assembly and said second support assembly.

21. The motorcycle rack according to claim 17, wherein said connection member is tubular shaped and has a longitudinal axis substantially in common with said longitudinal axis of said main body member.

22. The motorcycle rack according to claim 17, wherein said holding means of at least one of said one or more wheel chock assemblies comprises a frame extending generally downward from said connection member in a generally arcuate shape, one or mote wheel support members attached to said frame and one or more securing means for securing said wheel support members to said frame, said one or more wheel support members configured to substantially cradle said wheel of said motorcycle in said at least one wheel chock assembly.

23. The motorcycle rack according to claim 17, wherein said holding means of at least one of said one or more wheel chock assemblies comprises a pair of clamp plates and a plate connector interconnecting said pair of clamp plates, said pair of clamp plates configured to be disposed on opposite sides of said wheel of said motorcycle and said plate connector configured to clamp said pair of clamp plates against said wheel.

24. The motorcycle rack according to claim 17, wherein said one or more wheel chock assemblies comprises at least a first wheel chock assembly and a second wheel chock assembly, said holding means of said first wheel chock assembly comprising a frame having a pair of frame members and one or more wheel support members attached to said frame, said wheel support members configured to substantially cradle a wheel of a first motorcycle in said first wheel chock assembly, said holding means of said second wheel chock assembly comprising a pair of clamp plates and a plate connector interconnecting said pair of clamp plates, said pair of clamp plates configured to be disposed on opposite sides of a wheel of a second motorcycle and said plate connector configured to clamp said pair of clamp plates against said wheel of said second motorcycle.

25. A motorcycle rack for supporting a motorcycle in a generally upright position on a bed of a vehicle, said motorcycle rack comprising:

an elongated main body member having a principal longitudinal axis, a first main body end and an opposing second main body end, said main body member being longitudinally adjustable in length;

a first support assembly attached to said first main body end and to said vehicle;

a second support assembly attached to said second main body end and said vehicle, said first support assembly and said second support assembly configured to support said main body member in a substantially horizontal position above said bed of said vehicle; and a first wheel chock assembly having a pair of connection members slidably joined to said main body member between said first support assembly and said second support assembly, means for securing said pair of connection members to said main body member, a frame comprised of a pair of frame members, one of said pair of frame members extending generally downward in a generally arcuate shape from each of said connection members, one or more wheel support members attached to and disposed between said pair of frame members, each of said connection members disposed on said main body member so as to permit lateral movement of said pair of connection members, said one or more wheel support members configured to substantially cradle a wheel of said motorcycle in said wheel chock assembly.

26. The motorcycle rack according to claim 25, wherein said main body member is comprised of at least a first telescoping member, a second telescoping member and a means for fixing the longitudinal length of said main body member, said first telescoping member and said second telescoping member in telescoping relationship, said fixing means configured to fix the position of said first telescoping member relative to said second telescoping member.

27. The motorcycle rack according to claim 25, wherein at least one of said first support assembly and said second support assembly comprises a side member configured to be supportably attached to a vertically displaced wall of said bed and a clamp configured to fixedly clamp said side member to said vertically displaced wall of said bed.

28. The motorcycle rack according to claim 27, wherein said clamp is comprised of a channel member attached to and protruding inward from said side member, a clamp hook having a clamp tube, and a clamp member configured to be removably received by said clamp tube.

29. The motorcycle rack according to claim 25 further comprising one or more loop members on at least one of said first support assembly and said second support assembly.

30. The motorcycle rack according to claim 25, wherein at least one of said first support assembly and said second support assembly comprises a leg member attached to said main body member end and a receiver member attached to said bed and configured to receive said at least a portion of said leg member.

31. The motorcycle rack according to claim 30, wherein said receiver member comprises a receiver tubular member and a base member, said base member attached to said bed of said vehicle.

32. The motorcycle rack according to claim 30, wherein said at least a portion of said leg member is slidably received in said receiver member and configured to be in a locking relationship therewith to fix the height of said main body member relative to said bed.

33. The motorcycle rack according to claim 32, wherein said leg member is generally tubular shaped and fixedly attached to said first main body end and/or said second main body end of said main body member.

34. The motorcycle rack according to claim 25 wherein said connection member is tubular shaped and has a longitudinal axis substantially in common with said longitudinal axis of said main body member.

35. The motorcycle rack according to claim 25, wherein said one or more wheel support members are made from a flexible material and configured to draw said frame against said wheel when said wheel is placed into said holding means.

36. The motorcycle rack according to claim 25 further comprising one or more loop members attached to a tubular member slidably disposed on said main body member and means for removably positioning said tubular member on said main body member.

37. The motorcycle rack according to claim 25 further comprising a second wheel chock assembly, said second wheel chock assembly having a pair of connection members slidably joined to said main body member between said first support assembly and said second support assembly, means for securing said pair of connection members to said main body member, a pair of clamp plates, and a plate connector for interconnecting said pair of clamp plates, said pair of clamp plates configured to be disposed on opposite sides of a wheel of a second motorcycle and said plate connector configured to clamp said pair of clamp plates against said wheel of said second motorcycle.

38. The motorcycle rack according to claim 37, wherein each of said pair of clamp plates comprises a slot for receiving a portion of said plate connector therein.

39. The motorcycle rack according to claim 37, wherein each of said pair of damp plates comprises one or more ridges thereon, said ridges configured to cooperate with said plate connector to clamp said pair of clamp plates against said wheel of said second motorcycle.

40. A motorcycle rack for supporting a motorcycle in a generally upright position on a bed of a vehicle, said motorcycle rack comprising:
an elongated main body member having a principal longitudinal axis, a first main body end and an opposing second main body end;
a first support assembly attached to said first main body end and to said vehicle;
a second support assembly attached to said second main body end and said vehicle, said first support assembly and said second support assembly configured to support said main body member transversely across and above said bed of said vehicle so as to support said motorcycle generally perpendicular to said main body member; and
one or more wheel chock assemblies, each of said one or more wheel chock assemblies having a connection member, means for fixing said connection member to said main body member and means for holding a wheel of said motorcycle in a generally fixed position on or above said bed of said vehicle, said connection member slidably disposed on said main body member between said first support assembly and said second support assembly so as to permit movement of said connector along the longitudinal length of said main body member, said holding means attached to said connection member, said holding means selected from one of the following: (a) a frame having a pair of frame members and one or more wheel support members attached to said frame, said frame adjustably connected to said connection member so as to adjust the height of said one or more wheel support members above said bed of said vehicle, said wheel support members configured to substantially cradle said wheel of said motorcycle; and (b) a pair of clamp plates and a plate connector interconnecting said pair of clamp plates, said pair of clamp plates configured to be disposed on opposite sides of said wheel of said motorcycle and said plate connector configured to clamp said pair of clamp plates against said wheel of said motorcycle.

41. The motorcycle rack according to claim 40, wherein at least one of said first support assembly and said second support assembly comprises a leg member attached to said main body member and a receiver member attached to said bed and configured to receive at least a portion of said leg member.

42. The motorcycle rack according to claim 41, wherein said leg member is attached to either said first main body end or said second main body end of said main body member.

43. The motorcycle rack according to claim 41, wherein said receiver member comprises a receiver tubular member and a base member, said base member attached to said bed of said vehicle.

44. The motorcycle rack according to claim 41, wherein said at least a portion of said leg member is slidably received in said receiver member and configured to be in a locking relationship therewith to fix the height of said main body member relative to said bed.

45. The motorcycle rack according to claim 44, wherein said leg member is generally tubular shaped and fixedly attached to said first main body end and/or said second main body end of said main body member.

* * * * *